June 17, 1930.  E. LEE  1,765,081
ANIMAL TRAP
Filed July 25, 1929   2 Sheets-Sheet 1
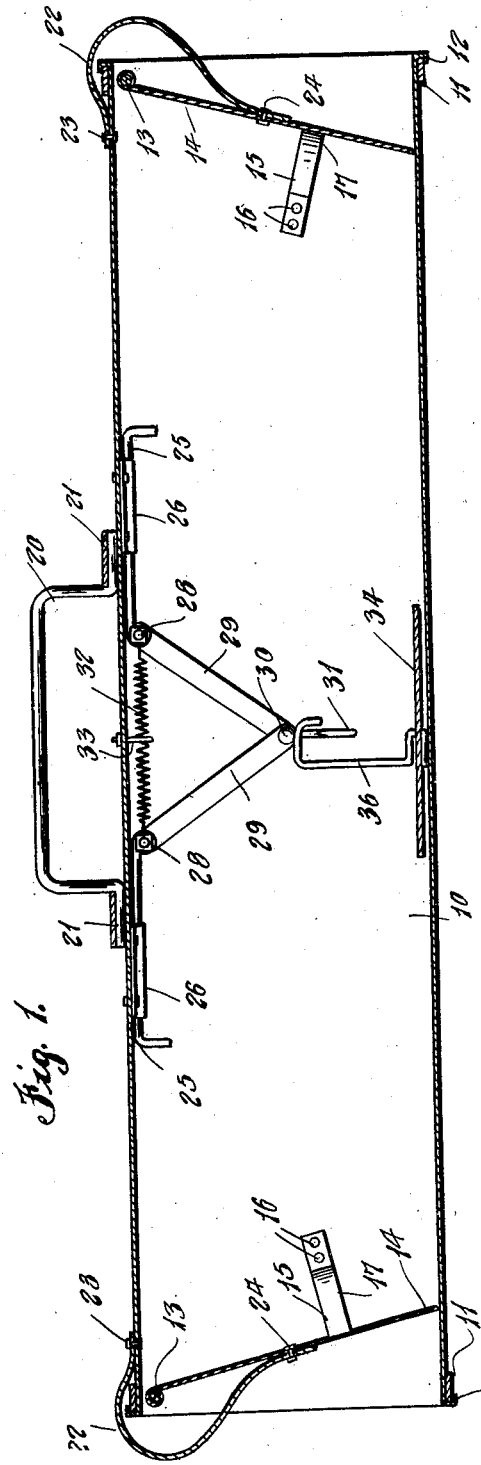
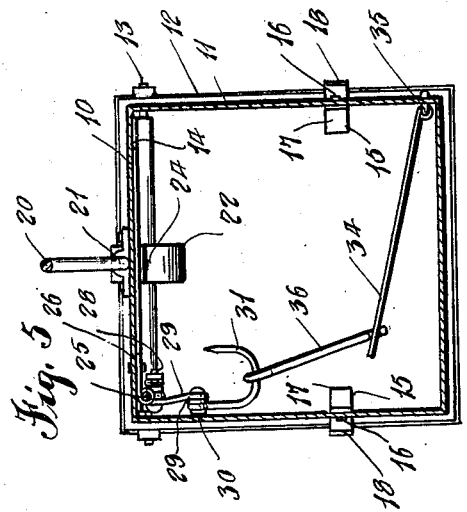
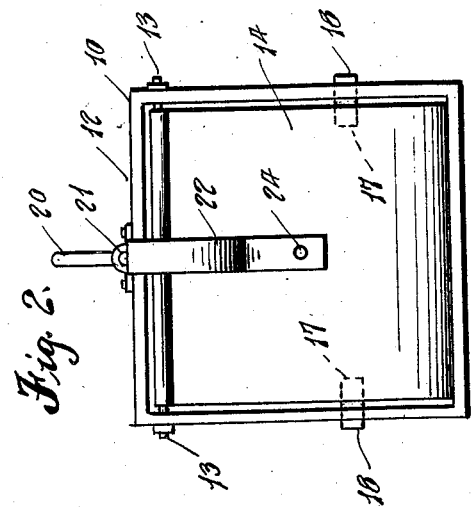
Inventor
E. Lee.

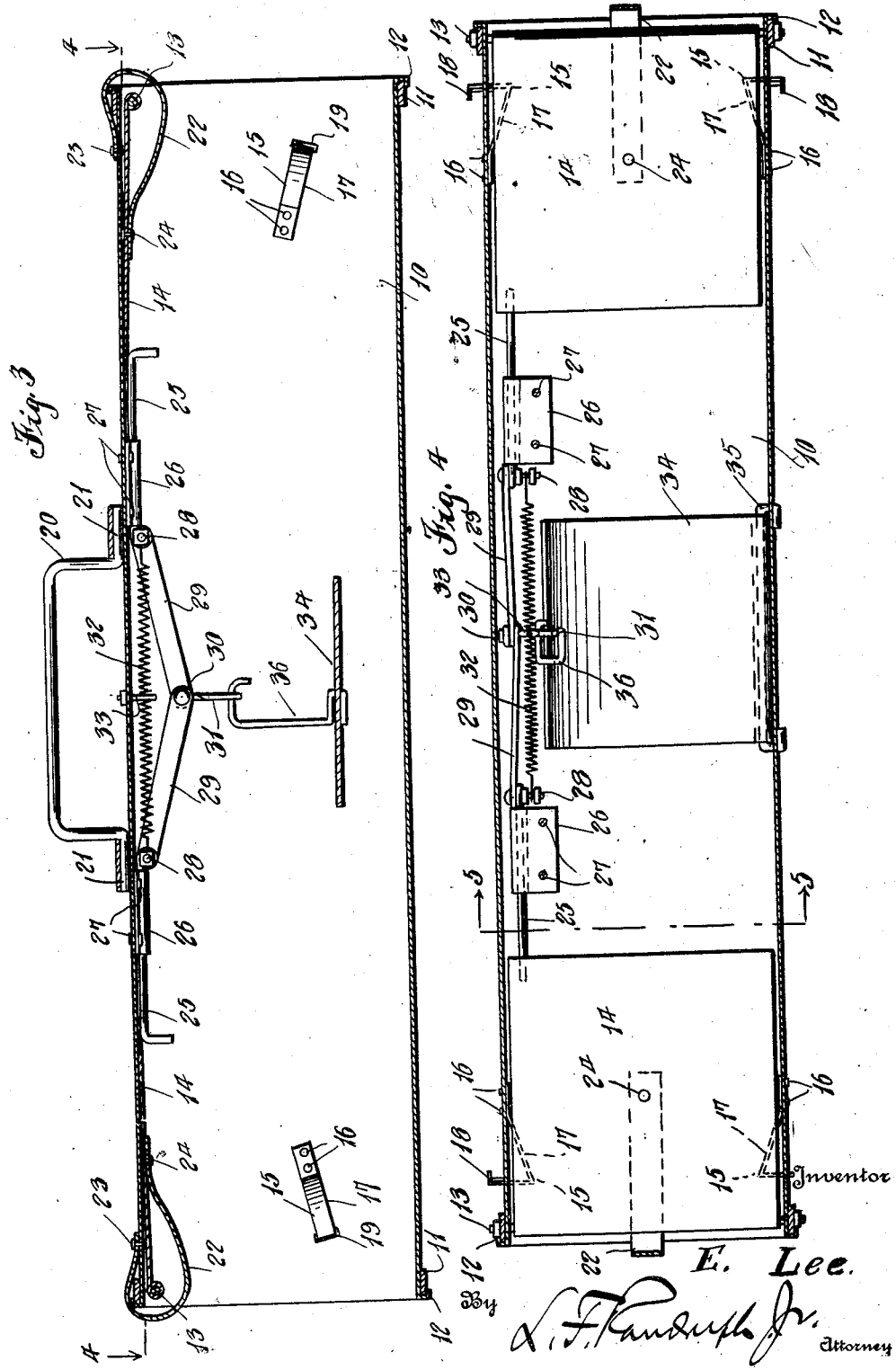

Patented June 17, 1930

1,765,081

UNITED STATES PATENT OFFICE

ELMER LEE, OF LIVINGSTON, MONTANA

ANIMAL TRAP

Application filed July 25, 1929. Serial No. 380,985.

This invention relates to an animal trap.

It is aimed to provide a generally improved construction adapted for the catching of animals of various kinds alive and without injury.

It is particularly aimed to provide an exceedingly simple and compact construction which will prove durable in use and is capable of manufacture at minimum cost.

Another object is to provide a novel construction of means for urging the closure to closed position and which will perform the second function of handles to facilitate the resetting of the trap.

A further object is to provide a novel means for maintaining the trap set, with the doors open, and for the support of bait which will necessitate the animal mounting a trip in an endeavor to gain access thereto.

Various additional objects and advantages will become apparent from the description following taken in connection with the accompanying drawings and in fact certain of which are pointed out in said description.

In said drawings:—

Figure 1 is a central vertical longitudinal sectional view through the improved trap showing the parts in closed position, Figure 2 is an end elevation of the trap, Figure 3 is a vertical sectional view similar to Figure 1 but showing the trap open or set, Figure 4 is a cross sectional view taken on the line 4—4 of Figure 3, and Figure 5 is a vertical cross sectional view taken on the line 5—5 of Figure 4.

Referring specifically to the drawings, 10 designates a box or casing which may be made rectangular as shown or of any desired shape, with the ends open. The box or casing 10 may be made of metal or other material as preferred and also may be made of any desired size according to the animal to be trapped. The end edges of the trap are reenforced by the bands such as 11 around which a flange 12 is clinched, or rolled as desired.

At the top across each end of the trap, a rod 13 is disposed on which end closures or doors 14 are pivotally suspended so that they may move from the open or elevated position of Figure 3 to the lowered or closed position of Figure 1, it being noted that the doors 14 are of such length that they cannot assume a vertical position and hence in closed position their lower edge will abut the bottom wall of the casing 10. As the doors 14 swing to the position of Figure 1 from that of Figure 3, they engage catches 15 which may be formed of a single strip of resilient metal and be riveted or otherwise fastened as at 16 to the side walls of the casing. The catches have inclined portions 17 and lateral portions 18 which extend freely through slots 19 in the side walls of the casing. Thus when the doors 14 move to closed position, they wipe against the portions 17, displacing the catches and moving past them, after which the portions 17 spring inwardly in order to prevent inward movement of the doors. When it is desired to reset the trap or remove a captive, the elements 18 are disengaged and moved outwardly so that the doors 14 may be swung upwardly and inwardly past the same. The trap may be provided with one or more suitable handles as at 20, that shown being pivotally connected to the casing as at 21 so that it may be folded flat against the same.

The doors or closures 14 are urged to the position shown in Figure 1. To accomplish this result, leaf springs of strip metal as at 22 are provided in loop form, one end being riveted or otherwise fastened as at 23 to the top wall of the casing and the other as at 24 to the doors 14. Such loops also serve as handles in moving the doors incidental to gaining access to a captive, in view of the fact that they are of loop form and extend outwardly beyond the ends of the casing.

Detent rods 25 at their outer ends extend slightly under the free ends of the closures 14 when the same are in elevated position, being freely slidable in brackets 26 bolted or riveted as at 27 against the under surface of the top wall of the casing. At the inner end, the detent rods 25 are pivotally connected as by bolts 28, to links 29 which are pivotally connected together as at 30 by a rivet or bolt which may be part of a bait hook 31. The bolts 28 have an expansive coil spring 32 connected therewith which is guided by an element 33 fastened to the top wall of the casing.

A trip platform 34 is pivoted at 35 within the casing and in the set condition of the trap inclines upwardly and rearwardly as shown in Figure 5 and by means of a link 36 loosely connected to its forward or free edge portion and the hook 31, the same is suspended in that position.

If desired, the casing 10 may be of a suitable collapsible construction as well as the rigid one shown.

In use, presuming the trap to be set as shown in Figures 3 and 5, with the platform 34 elevated, the doors 14 elevated and so held by the rods 25, bait is placed upon the hook 31. An animal can enter the trap through either end and when endeavoring to reach the bait on the hook 31, will tread upon the platform 34 and its weight will cause the same to swing on the pivot 35, thus moving hook 31 downwardly and drawing the outer ends of the links 29 closer together, thus moving the rods 25 inwardly and releasing the closures, which immediately swing downwardly through the action of the springs 22 into the position shown in Figure 1, where they are locked against inward movement by the catches 15. The latter condition of the trap is shown in Figure 1. The captive may be removed through opening the closures 14 which is permissible when the portions 18 are pulled outwardly. If the closures are not desired to fully open, the elements 22 may be grasped and operated as handles for such doors or closures.

Various changes may be resorted to provided they fall within the spirit and scope of the invention.

I claim as my invention:—

1. A trap of the class described having a casing, inwardly movable closures, detent rods engaging the closures to prevent closing thereof, links pivoted to said rods and together, expansive coil spring means serving to retain the rods in door-retaining position, bait supporting means carried by the links, and a trip platform, and means whereby movement of the platform will operate the links and rods to release the doors.

2. A trap of the class described comprising a casing, closures for the ends thereof, spring means to normally urge the closures to closed position, rods to maintain said doors in their opened position, brackets slidably mounting said rods, links, bolts connecting the links to the inner ends of the rods, means pivotally connecting the links together, an expansive spring means connected to said bolts, a bait supporting member supported from the links, a trip platform, and a connection between said platform and said bait supporting means whereby the weight of an animal upon the platform will cause operation of the links and rods to permit closing movement of the doors.

In testimony whereof I affix my signature.

ELMER LEE.